Dec. 23, 1941.    W. E. ROONEY    2,266,807
FILLED CAN WEIGHING AND SORTING MACHINE
Filed Sept. 7, 1938    2 Sheets-Sheet 1

INVENTOR.
Walter E. Rooney
BY Ivan D. Thornburgh
Charles H. Cuno
ATTORNEYS

Dec. 23, 1941.   W. E. ROONEY   2,266,807
FILLED CAN WEIGHING AND SORTING MACHINE
Filed Sept. 7, 1938   2 Sheets-Sheet 2
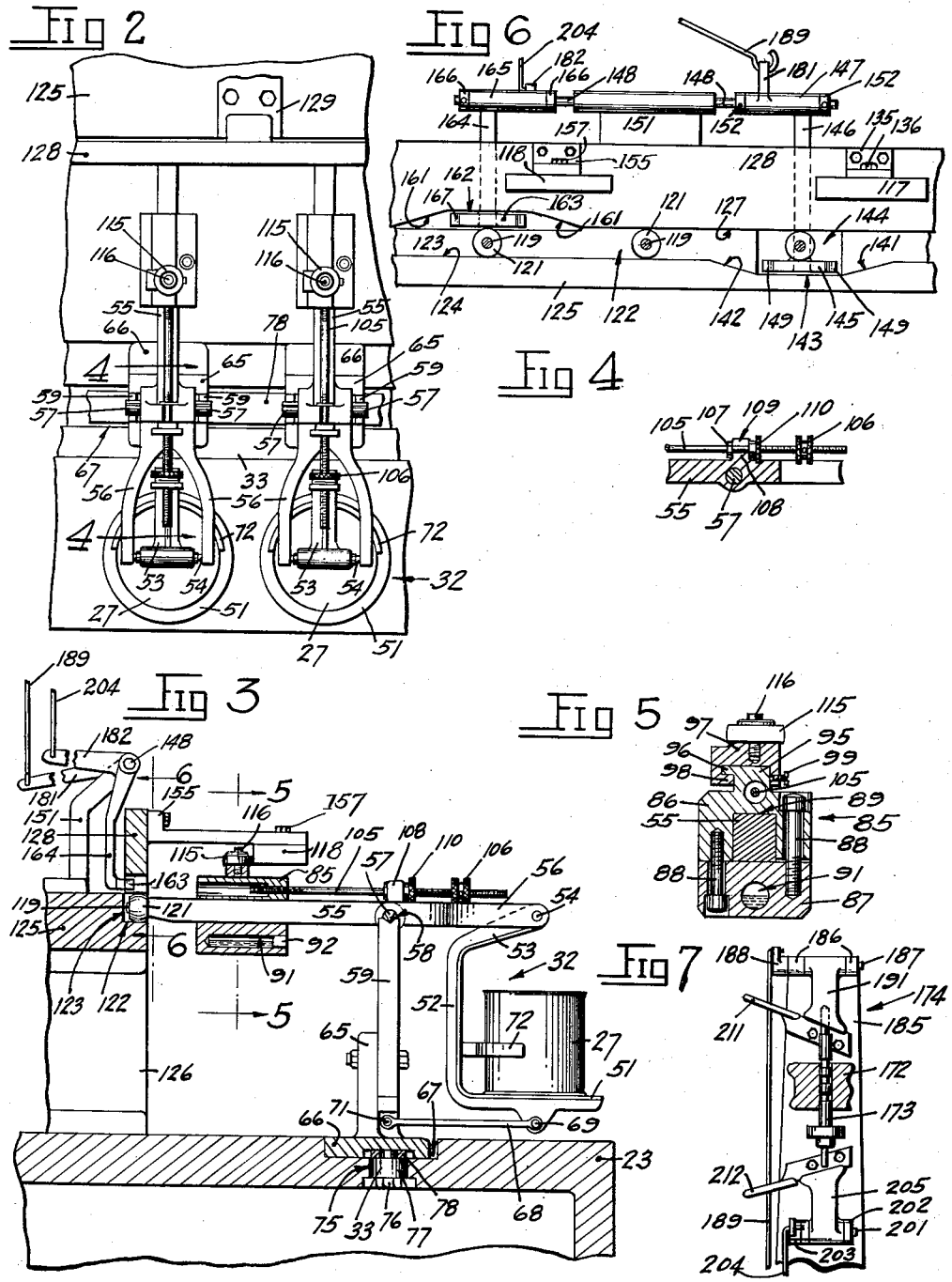
INVENTOR.
Walter E. Rooney
BY Ivan D. Thornburgh
Charles H. Crue
ATTORNEYS Patented Dec. 23, 1941

2,266,807

UNITED STATES PATENT OFFICE 2,266,807

FILLED CAN WEIGHING AND SORTING MACHINE

Walter E. Rooney, Bellingham, Wash., assignor to American Can Company, New York, N. Y., a corporation of New Jersey Application September 7, 1938, Serial No. 228,857

7 Claims. (Cl. 209—121)

The present invention relates to weighing and sorting machines and has particular reference to the double weighing of filled open top cans by first weighing the can to determine if it is lighter than a certain weight, or heavier, changing the setting of the scales and then reweighing this time to determine if the can is heavier than a certain weight, or lighter, such double action classifying the cans as to weight into a normal weight range of definite limits or into a lighter or heavier than normal range, the cans after weighing being automatically segregated in accordance with such classification.

In the canning of many products it is particularly necessary to insure against filled cans that have a less than prepredetermined weight (i. e., that are light weight) from getting out into the trade and with some products unless the heavier or fuller cans are greatly overweight it does not pay to remove any of the contents especially those which are barely heavier than the maximum of the normal weight. Such slightly heavier can should be classed as normal.

Where a single weight determination is made the normal weight range is fixed and necessarily this range is relatively narrow so that cans which are only slightly heavier than the ideal normal weight cans must be rated as too heavy. In conventional weighing, any adjustment of the scales will not spread the normal weight range but will either raise or lower both the light and the heavy values.

The present invention contemplates automatically resetting the scales between two weight determinations so that any range of normal weight can be obtained and this in no way interferes with an accurate weight setting for the minimum and also for the maximum weight range values. In this way cans having a little more than adequate fill for the ideal normal weight may be classified as normal. By such a system the amount of variation can always be determined for the particular product being canned.

An object of the invention is the provision of a weighing and sorting apparatus which functions to give two weighing determinations, the two being made under different circumstances but both being used for one weight range determination.

Another object is the provision of an apparatus of the type specified in which the scales which are used for weighing are reset between a first and a final weighing action.

Still another object of the invention is the provision of an apparatus of the character described in which filled cans to be weighed are automatically conveyed through two weighing positions, in the first of which an under weight, if any, is determined and then after a weight change of the scale an over weight, if any, is determined or the reversal of under and over weight can be had.

A further object of the invention is the provision of a weighing and sorting apparatus which subjects articles to a weighing operation under certain weighing conditions, sets certain sorting devices if the weight is of a certain character, then again weighs under other conditions, sets other sorting devices if the weight is of a different character and thereupon groups or segregates articles of one weight range from those of another as determined by the settings of the sorting devices.

Numerous other objects and advantages of the invention will be apparent as it is better understood from the following description, which, taken in connection with the accompanying drawings, discloses a preferred embodiment thereof.

Referring to the drawings:

Fig. 2 is a fragmentary plan view of two of the weighing units disclosed in Fig. 1 shown on an enlarged scale;

Fig. 3 is a sectional view drawn to an enlarged scale of one of the weighing units as viewed substantially along the line 3—3 in Fig. 1;

Fig. 4 is a sectional detail taken substantially along the line 4—4 in Fig. 2;

Fig. 5 is an enlarged sectional view of the weight unit as viewed along the section line 5—5 in Fig. 3;

Fig. 6 is a sectional elevation of part of the mechanism as it would appear if viewed along the section line 6—6 in Fig. 3; and Fig. 7 is an end elevation of the detector control unit, parts being shown in section.

Figure 1:
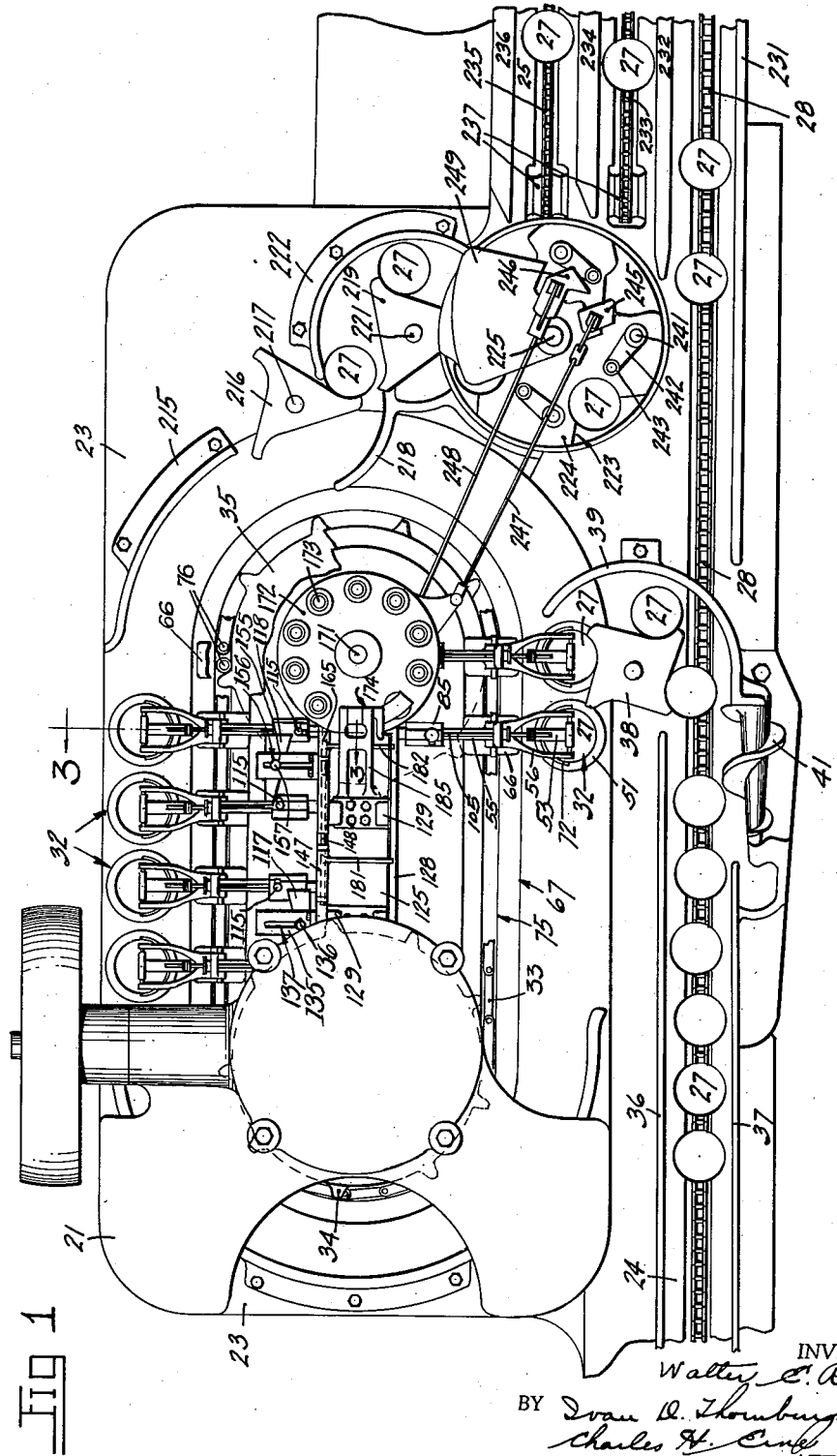
Figure 1 is a plan view of a weighing and sorting machine embodying the present invention, parts being broken away and parts removed.

The apparatus embodying the present invention comprises a continuously moving conveyor which carries a series of weighing scale balance units adapted to receive and weigh filled cans. The weight elements of the several balance units are controlled so that each balance unit is made effective for slightly different weighing conditions during the conveyance of a can through the weighing cycle and provision is also made for sorting or segregating the weighed cans according to different weights.

A weighing and sorting apparatus to which the features of the present invention may be in part applied is disclosed in the W. R. Smith Patent 2,098,260, issued by the United States Patent Office on November 9, 1937, and the description which follows will be directed to such an application as exemplary of one form in which the invention may be used.

Each scale unit when it has received a can for weighing passes around its path of travel with the conveyor. This path of a preferred type conveyor as shown best in Fig. 1 is straight on the sides and arcuate at the ends. During a large part of the travel of a can with the conveyor, the scale pan of the unit with its can is held accurately in a horizontal plane, i. e., held against any weighing movement, and is otherwise protected against irregular movement or sudden jar. Obviously, the conveyor could take the form of a turret for carrying the weighing scale balance units and where such a turret form is used the cans will pass in a circular path of travel.

As to the disclosed form, in one position of its straight path of travel, the can with its scale unit passes into weighing position and the unit is then released from its held condition for weighing movement whereupon weighing of the can takes place. The first weighing action is effected with a scale pan weighted at a certain predetermined setting. This phase of the weighing act may be directed to a determination of whether the can is lighter than a given value. If it is lighter than the required minimum weight certain sorting elements will be effected and the balance unit will carry through a subsequent weighing action without change of other sorting units.

After the light weight determination has been completed regardless of whether the can is light or heavy, the scale unit is again blocked as to weighing movement, i. e., momentarily held in a horizontal plane. The setting of the scale pan may then be altered so that a greater weight is required to change the position of the balance unit for a weighing movement.

Where the can is above the light weight limit as already determined on the first weighing phase the scale unit may or may not be further changed as to weighing position when it is subjected to the second weighing act, this time with the heavier setting, the scale unit being again released for such action.

Where the can weight of a non-light weight can is not enough over-weight for that required to change the position of the scale unit, this second phase will pass the can as being in the normal range. If, however, the weight is excessive and the weighing position of the scale unit is altered, the can will be adjudged as an over weight can and certain sorting setting will be made.

After this double weighing the scale unit is again locked against movement and is maintained in a fixed horizontal plane while the unit passes from its straight line of travel and advances along its arcuate path. It is then that the sorting and segregation become effective from the particular setting made as to the sorting elements.

The mechanism for performing the various steps in the weighing and sorting operations is carried upon a frame 21 (Fig. 1). This frame includes a horizontal table section 23, a portion of which is extended in one direction as a feed table 24 and in the opposite direction as a discharge table 25.

Filled cans 27 are carried into the machine and to the scale units along the table section 24 on a suitable conveyor chain 28 which not only extends over the feed table section but also throughout the entire length of the machine and into the discharge table section 25.

Each scale unit, indicated generally by the numeral 32 and shown in detail in Figs. 2 and 3 is carried on an endless chain conveyor 33 which moves over the table 23 and along a combined straight and arcuate path as it passes over spaced horizontally disposed sprockets 34, 35. Both sprockets are preferably positively rotated in unison and in a suitable manner to drive the chain conveyor 33 and to carry the scale units 32 at a uniform rate of speed around the two straight and the two arcuate paths of travel.

The cans 27 while carried by the conveyor chain 28 along the feed table 24 are held in a straight line by spaced side guide rails 36, 37 which may be mounted on the feed table. The inner rail 36 terminates just short of a star wheel 38 which is used to transfer the cans from the chain 28 to the scale units 32 on the chain conveyor 33. On the opposite side of the feed table the outer guide rail 37 terminates short of a circular guide extension 39 which curves around the star wheel 38.

Intermediate the adjacent ends of the rails 37, 39 there is interposed a can spacer or timing screw 41 which is continuously rotated in suitable manner and a spiral thread of this screw engages and separates the foremost can in the line of cans on the feed table 24 and delivers it into one of the fingers of the star wheel 38. This is a common type of timing device and is herein used to properly dispose each can so that it will be correctly delivered to one of the scale units 32.

At the time a can is placed in the constantly moving scale unit, the latter has just begun its straight line travel advancing toward the left (Fig. 1) from the star wheel 38. In Fig. 1 only a few of the scale units 32 are shown but it will be understood that these units extend in uninterrupted spaced relation around the entire length of the chain conveyor 33.

Nothing is done to the can during this first straight line of travel nor is any operation performed on the can as the chain conveyor section moves over its sprocket 34 and passes through its first arcuate path of travel. A circular guide 42 mounted on the table section 23 prevents any dislodgment of the can as it is carried in its circular path.

Each scale unit 32 (Figs. 2 and 3) comprises a scale pan 51 which extends horizontally and at one side is an integral part of a vertically disposed arm 52 which at its top merges into an inclined arm 53. It is at the end of this arm that the pivotal support for the scale pan is made, this being on a pin 54.

A scale or balance beam 55 is associated with each of the scale pans and its outer end is formed into spaced arms 56 which carry the pivotal pin support 54 for the scale pan. The scale beam is pivotally mounted on suitable anti-friction knife edge pivots 57 which extend out on either side of the beam and rest in V-notch seats 58 carried in upper spaced ends of a support bracket 59.

Each bracket 59 is secured to an upright wall 65 of a block 66 which constitutes an element of the chain conveyor 33. The blocks 66 rest upon and move over a trackway 67 formed in the table 23. This is a smooth track and extends all of the way around the table 23 and the blocks are sufficiently large to form a substantial support so that the scale units are advanced throughout their path of travel without undue jarring or sudden or jerky movement.

The scale pan 51 is held against undue swinging by a tie rod 68 pivotally connected at 69 below the scale pan and pivotally connected at 71 to the bracket 59. When a can 27 is placed by the star wheel 38 onto a scale pan 51 it is centered on the pan by sliding into a circular centering fork 72 carried by the arm 52 and it is at such a time that the tie rod 68 is most effective to prevent swinging.

A continuous slot 75 (Figs. 1, 2 and 3) is cut in the top of the table 23 and extends along the center of the trackway 67 and this slot is formed with accurately finished side walls which extend in parallel spaced straight portions and concentric arcuate end portions and determine the path of travel of the scale units 32. Each block 66 carries a pair of shouldered bolts 76 (Figs. 1 and 3) which are threadedly secured in the block and each bolt carries a roller 77. The rollers 77 fit snugly within the track slot 75 and provide an accurate positioning means for keeping the scale units 32 in their prescribed path of travel.

Bolts 76 in adjacent blocks 66 are loosely connected by links 78 (see also Fig. 2) and link, block and bolt provide the connecting elements making up the chain conveyor 33. The rollers 77 thus accurately guide the conveyor in an even motion and also form the spaced engaging elements for the teeth of the drive sprockets 34, 35.

Each balance beam 55 extends back of its knife edge support 57 and carries a sliding weight 85 (Figs. 3 and 5). The position of this weight on its beam determines the counter-balancing effect for a full can, its supporting scale pan 51 and associated parts already described. It is such a weight that may be initially positioned for the first of the weighing actions and which may then be shifted in its position on the beam by sliding in one direction or the other to reset it for the second cycle of the weighing action.

Obviously where the first weight determination of a filled can is to ascertain if the can is on the light side, the minimum setting for the normal weight range will position the weight a certain definite distance from the knife edges 57. After weighing the can, the weight is then slid on the beam to a position further from the knife edge support. With this new position and a longer weight arm a greater weight in the can is therefore required to tip the scale. This second setting therefor will be for the maximum weight of the normal weight range.

A reverse setting for the two weighing actions, that is, first weight position further from the pivotal beam support than the second setting will give the maximum weight for the range first and then the minimum.

In commercial practice it has been found that the use of a heavier weight for a shorter weight arm gives smoother operation than a lighter weight at a greater weight arm distance. Obviously, where a heavy counterweight is used only a very short shifting distance is needed between first and final weighings to obtain an average desired range of setting.

Experience has shown that in most cases greater accuracy can be had by adjusting the position of the weight for one setting and then by locking or otherwise holding such adjustment as to the principal weight adjusting auxiliary weight elements. The desired change of weight setting may thus be easily obtained by merely shifting an increment of the primary weight. Such an arrangement is herein illustrated and will now be described in detail.

A main sliding weight member 85 (Figs. 2, 3 and 5) comprises an upper section 86 and a lower section 87 which are locked together by screws 88. The upper section is longitudinally slotted as at 89 for the reception of the balance beam 55. This slot is dimensioned so that the weight may be freely moved or slid along the beam but will ordinarily remain in any set position while the scale unit is being carried around and while the beam moves up or down as in weighing.

The lower weight section 87 of the main weight 85 is preferably formed with a horizontally extending chamber 91 closed at one end by a screw plug 92 in which mercury may be enclosed to partially fill the chamber. This provides a shiftable weight element, the mercury tending to flow quickly from one end to the other of the chamber upon the slightest tilting of the beam.

The upper section 86 of the main weight member 85 (Fig. 5) at the top is formed with a central rib 95 having on one side an overhanging ledge 96 and this rib is provided as a support for an auxiliary weight 97. The auxiliary weight member normally slides freely on the main weight member and where only an increment of the weight is used in the double weight procedure already described it is this auxiliary weight that provides for the variable weight increment. The weight sections 86, 87 and auxiliary weight 97 together constitute a composite weight unit which may be moved together, or the auxiliary weight may be moved alone as desired, upon or relative to the balance scale beam 55.

Auxiliary weight member 97 has a tail section 98 which hooks under the main weight projection 96 to provide a smooth sliding member which cannot be inadvertently dislodged. Where the entire weight is to be shifted, that is, where the increment principle is not used, a single weight will suffice. Provision is made, however, in the present construction whereby the two weight members 85, 97 may be locked together and used as a single composite weight unit to produce the variable weight settings for the double weighing actions. To provide a convenient lock for such use of weights a set screw 99 carried by the auxiliary weight member may be screwed in to firmly clamp against one side of the rib 95 of the main weight member 85. The entire weight, including the parts 86, 87 and auxiliary weight member 97, thus functions as a single weight and may be shifted as a unit.

When the more convenient increment weight principle is used the set screw 99 is not used but the auxiliary weight 97 is left free to slide on the main weight. As previously suggested it is advantageous to accurately determine the correct place on the beam for the main weight 85 for a light weight setting, for example, and then to lock the weight at this position. This adjustment and locking may be accomplished by a threaded rod 105 (Figs. 2, 3 and 4) carried on the beam 55.

Rod 105 may be easily turned by a knurled finger collar 106 pinned to the rod near one end. The opposite end of the rod is threaded in the upper weight section 86. The rod is formed with an enlargement or collar 107 (see also Fig. 4) which abuts against a projection 108 formed at the top of the balance beam 55 and just above its pivotal support. A slot 109 extends into the projection from above and the rod 105 is dropped down into the slot when this threaded adjusting feature is used. A lock nut 110 threadedly disposed on the rod beyond the collar 107 may be used to clamp the rod against turning when the setting is made.

When this clamping of the weight is not used the rod 105 is unscrewed from the weight entirely and lifted out of the slot 109. The rod and all parts carried thereon are then laid away and are not used at all.

Either the clamped unit weight elements 86, 87 and the auxiliary weight 97 when clamped thereto by set screw 99, or the auxiliary weight 97 when released and used alone, are moved back and forth relative to the balance beam by cam action. For this purpose a cam roller 115 is rotatably mounted on a headed stud 116 which is threadedly secured to the auxiliary weight. There are two cams 117, 118 (Figs. 1 and 6) which are both located on the same straight line of travel of the scale units 32. Each cam functions when engaged by a roller 115 of a passing scale unit to set the main and auxiliary weight unit or the auxiliary weight alone, on its balance beam 55, such a shifting of the weight or weights being just prior to a weighing action.

Excepting for the actual time of weighing in each of its two steps, each scale unit is maintained in a horizontal plane and is thereby protected against sudden jar or irregular movement. This holding feature will now be considered.

At the weight or inner end of each beam 55, there extends a pin 119 on which a beam roller 121 (Figs. 3 and 6) freely rotates. This roller, except for the two restricted places in the travel of the scale unit, where weighing takes place, is closely confined within a horizontal slotted cam track 122 which extends around and inside of the conveyor 33.

The back wall of the cam track (designated by the numeral 123) and a bottom wall 124 are cut in the outer edge of a track plate 125 (see also Fig. 1) which is located in the center of the machine. This plate is carried on brackets 126 (Fig. 3) which are mounted on and extend up from the table 23.

The top wall of the cam track 122 is provided by the lower edge (designated by the numeral 127) of an annular bar or rail 128 which is secured in fixed position on the track plate 125 by means of brackets 129 (Figs. 1 and 2). The spacing of the rail 128 is such as to keep the cam track edges 124, 127 parallel to and for the major extent of the slotted cam track 122 just far enough to freely pass the beam rollers 121. At the two weighing positions or stations however there is an interruption of this parallel arrangement.

In this present embodiment of the principle of dual weighing, a scale unit 32 with its can 27 moves alongside of the cam 117 as soon as it starts its straight line of travel after passing around the sprocket 34 (see Figs. 1 and 6). This cam 117 moves the weight unit or the weight increment, as the case may be, along the beam 55 and closer to the pivotal center of the beam. This prepares the scale unit for the first or light weight determination.

Cam 117 is adjustably secured to the end of an arm 135 which is bolted to the rail 128, the cam being hung under the arm and held in place by a bolt 136 which passes through a slot 137 cut through the arm and which is threaded directly in the cam. This slot and bolt arrangement gives the desired adjustment for the position of the cam. The cam's position in its turn governs the setting for the light weight action.

The slotted cam track 122 where it passes beneath the cam 117, as best shown in Fig. 6, is enlarged to provide for release of a scale unit 32 passing through the first weighing station. Since in this case a light weight phase determination is desired this enlargement is produced by a dip in the lower track surface 124. This dip is made by two inclined sections 141, 142 which merge at their near ends into a lower level straight section 143.

The track plate 125 in the back of the widened slotted cam track 122 is cut back as at 144 to provide clearance for a shoe 145 which is carried on the lower end of a vertically disposed arm 146 of a swinging element of a detector member which function it is to properly segregate the weighed cans into the light, normal and heavy classifications. The arm 146 at the top is formed with an extended tubular sleeve 147 which is loosely mounted on one end of a horizontal rod 148. The face of the shoe 145 is beveled back at both ends in inclined surfaces 149.

The rod 148 is carried in the upper end of a bracket 151 (see also Fig. 3) mounted upon the track plate 125. Collars 152 are pinned on the rod 148 on either side of the sleeve 147. This prevents shifting of the swinging element longitudinally of the rod but allows free rocking movement thereon.

The shoe 145 (Fig. 6) is entirely below a beam roller 121 of a passing scale unit, as long as the roller rides against the upper wall 127 of the slotted cam track 122. In other words when the weight or weights of a scale unit have been positioned on the balance beam for light weight determination and the beam roller 121 passes over the incline track section 141 if the can 27 in that scale unit is heavier than the light weight setting the roller 121 will roll against the upper track wall 127 and will have no effect upon this light weight swinging detector element.

However, if the can is light in weight it will not hold the beam roller 121 against the upper track but the roller, rolling along the lower track, moves down the incline 141 and passes to the lower level track 143. The shoe 145 extends into the path of the roller at this position and the end face of the roller, moving first along one incline surface 149 of the shoe 145, forces the latter back. This rocks the swinging element sleeve 147 on the rod 148 and sets up the detector unit for light weight classification, as will be hereinafter explained.

The scale unit passes on carrying its can still on its straight course and toward the second weighing station. As the beam roller 121, where the can being weighed is light, leaves the face of the shoe 145 and passes along the other inclined surface 149, the shoe returns back into its normal position ready for the next can. The track incline 142 over which such a beam roller now passes, raises this end of the scale unit bringing the scale pan 51 and its can 27 back into middle horizontal position. The roller 121 is thus brought back into the parallel section of the track 122 preparatory to a second shifting of the weight or weights setting the scale unit this time for the heavy weighing phase of the weighing action.

The cam roller 115 now engages the cam 118 and the heavy weight setting is effected by moving the weight farther from the pivotal center of the scales. The cam 118 (Figs. 1, 3 and 6) is carried on a bracket 155 which is bolted to the rail 128. The bracket 155 is slotted as at 156 (Fig. 1) and a bolt 157 threaded into the cam 118 passes through the slot and when screwed down holds the cam in adjusted position. Thus by shifting the position of the cam various heavy weight settings can be made.

Just after passing the cam 118 the scale unit passes into weighing position for the heavy phase. The slotted cam track at this second weighing position is again enlarged to provide for release of the passing scale unit 32 this time by a rise in the track surface 127 of the rail 128. This track rise is made by two inclined sections 161 (Fig. 6) which merge at their near ends into a higher level straight section 162.

In the opening thus made in the rail 128 there is provided a clearance for a shoe 163 (see also Fig. 3) which is carried on the lower end of a vertically disposed arm 164 of a second swinging element of the detector member. The arm 164 at the top is formed with an extended tubular sleeve 165 which is loosely mounted on the horizontal rod 148. The sleeve 165 is located on the end of the rod opposite to the sleeve 147 of the light weight unit and collars 166 pinned on the rod on opposite sides of the sleeve keep the swinging element of the heavy weight detector in proper position. At the ends, the face of the shoe 163 are inclined back as at 167.

The shoe 163 is entirely above a beam roller 121 riding on the lower track 124, that is, a light weight can will pass the shoe without affecting it in any way. A can that is not light weight but one in the normal range will also pass through the second weighing station while the detector unit remains inactive. It is only when a can sufficiently heavy to cause the beam roller 121 to roll on the upper track surface and to move on over the incline section 161 and onto the raised wall 162 that a heavy can detection is made.

The face of a beam roller 121 for a heavy can in passing along the first inclined wall 167 of the shoe pushes it back and rocks the detector swinging element for a heavy weight classification. This completes the second weighing phase and the beam roller 121, in leaving the shoe which moves back as the roller clears its second inclined face 167, moves down the track incline 161 and into its normal position.

It will be observed that three different conditions obtain as to a scale unit with its can passing along the straight path of travel at the rear side of the apparatus. Some of the cans through the scale unit parts effect a movement of the light weight detector swinging element, some a movement of the heavy weight element and some have no effect on either. These conditions, therefore, result respectively in light, heavy and normal weight classification.

The interpretation of such classification into the physical segregation of the cans into the proper weight ranges may be done in one of several ways. The drawings illustrate the distributing and sorting apparatus shown in the W. R. Smith Patent 2,098,260, above noted and only a brief mention need now be made of this feature of the present machine.

The sprocket 35 is mounted on a vertical shaft 171 (Fig. 1) and this shaft also carries a detector disc 172 (see also Fig. 7) which is located above the track plate 125. A series of vertically movable trip rods 173 are carried in the disc 172 and each rod corresponds to a particular tooth of the sprocket 35. Only a certain scale unit will correspond, therefore, with a particular trip rod.

Each trip rod has three vertical positions within the disc. The central position of each rod corresponds to a normal can weight determination and this position holds when neither the light weight detector element nor the heavy weight detector element is actuated at the weighing stations. The disc 172 rotates in a clockwise direction, as viewed in Fig. 1, and after the scale unit 32 corresponding to a particular trip rod 173 has passed through the second weighing station, the rod moves into a detector control unit 174 (shown in some detail in Fig. 7) mounted on the track plate 125 and extending over the edge of the disc 172.

The detector control unit 174 is prepared for actuation of the trip rod 173 by the swinging weighing elements which are parts 145, 146 and 147 at the light weight weighing stations and parts 163, 164 and 165 at the heavy weight weighing stations. If the can is either in the light or the heavy weight range, movement of one of the sleeves 147 or 165 as the case may be, will effect a corresponding vertical shifting of the associated trip rod 173.

However, if the can is in the normal range there will not be any sleeve actuation. The trip rod 173 corresponding to the scale unit 32 containing the normal weight can, will be moved into its central vertical position if it is not already in such position.

The sleeve 147 of the light weight weighing element carries an arm 181 (Figs. 1, 3 and 6) and this connects with the control unit 174. In like manner the sleeve 165 of the heavy weight weighing elements is likewise formed with an arm 182 which is also connected to the control unit.

This detector control unit 174 (Figs. 1 and 7) is housed in a column 185 which extends up from the track plate 125 and at the top the column is formed into suitable bearings 186 for a short rock shaft 187. The rock shaft at one end carries a lever arm 188 which is connected, by a connecting link 189, to the arm 181 of the light weight weighing element. Intermediate the bearings 186 the rock shaft 187 also carries a flipper 191. Flipper 191 normally hangs down in an inclined position and at such time is out of the path of the trip rods 173 moving under the upper end of the column 185 with the rotating disc 172.

When, however, the light weight swinging weighing element is actuated and the arm 181 thereof is moved the flipper is brought down into a vertical position and in the path of travel of the next oncoming trip rod 173. This position of the flipper effects the proper sliding of the trip rod 173 to subsequently segregate a can associated with the scale unit corresponding to the particular trip rod 173 so that the can will be discharged as a light can. A similar construction is associated with the heavy weight swinging weighing element and this is best illustrated in Fig. 7.

Directly beneath the rock shaft 187 is located a short rock shaft 201 which is movable within bearings 202 extending inwardly from the column 185. Rock shaft 201 at one end carries a lever arm 203 which is connected by a connecting link 204 to the arm 182. The shaft 201 intermediate the bearings 202 carries a flipper 205 which extends up from the shaft and normally rests at a slight angle off of the vertical and out of the path of the various trip rods 173 moved by the disc 172 as it passes a rod adjacent the column 185.

When the heavy weight swinging element is actuated the arm 182 is moved and through the connection 204 and the lever arm 203 the shaft 201 is rocked in its bearings to bring the flipper 205 into vertical position. When in this position the flipper is in the path of the next passing trip rod 173 and engagement of the lower end of the rod effects a lifting of the rod so that the subsequent discharge of the associated can will be in the heavy weight can group.

Provision is made for centering each trip rod 173 as it moves adjacent the column 185 and for this purpose there is provided an upper re-set cam 211 (Fig. 7) and a lower re-set cam 212. Both of these cams are secured to the inner face of the column 185 and the lower surface of the upper re-set cam and the upper surface of the lower re-set cam are inclined but in different directions so that when the disc 172 moves a trip rod 173 in between the re-set cams one or the other of the cams will strike against the rod if it is out of center position and will bring the trip rod 173 into central position. Since both flippers 191, 205 are out of trip rod engaging position if a normal can has been weighed the associated trip rod 173 passing the column at that time and leaving the re-set cams 211, 212 in its central position will remain so and the can will be discharged as normal.

When a light weight can has been weighed, the flipper 191 is in rod engaging position and by reason of its inclined surface, which forms a continuation of the lower surface of the re-set cam 211, will engage the passing trip rod 173 and move it into its lowermost position. In like manner, if the can has been weighed as a heavy can the flipper 205 is in rod engaging position and its inclined upper surface, which forms a continuation of the upper surface of the re-set cam 212, will cause the next passing trip rod 173 to be brought into its uppermost position. This explains the way in which the detector element of the control unit 174 functions to set a trip rod in accordance with the weight of the can corresponding to that particular rod.

The weighed can to be segregated when it first passes onto its arcuate path of travel is held against displacement by a guide rail 215 (Fig. 1) carried on the table 23. It has not moved far, however, before a finger of a three fingered star wheel 216 continuously rotating with a vertical shaft 217 moves in behind the can and ejects it from the scale pan 51. In this action the can moves along a curved guide 218 and into a second star wheel 219 continuously rotating with a vertical shaft 221.

A curved outer guide rail 222 keeps the can in the star wheel 219 through about 180° of travel. The star wheel 219 delivers the can into one of four spaced pockets 223 of a turret 224 which rotates with a vertical shaft 225 in proper time with the other moving parts of the machine and in a counter-clockwise direction as viewed in Fig. 1. The position at which a can is discharged from the pocket 223 during its peripheral travel with the turret 224 determines the sorting and segregating of the cans into the proper normal, heavy and light weight can lanes on the discharge table 25.

The discharge of each can from the turret 224 is thus made at one of three positions on the discharge table 25. If the can is of normal weight it is ejected first, Fig. 1 illustrating such a normal can after it has been placed on the chain 28. After being placed upon this chain the can is further retained in a straight path of travel by passing between an outer guide rail 231 and an inner rail 232 both of which are secured to the discharge table 25.

If the can is over weight and the trip pin 173 carried by the disc 172 is in its raised position the can is not discharged from the turret pocket 223 until it has passed the inner end of the guide rail 232. It is, however, discharged immediately after this position is reached and the can passes to an over weight chain discharge conveyor 233. The can is held in this discharge lane by the guide rail 232 and another similar guide rail 234 mounted upon the table 25 and extending parallel with the guide rail 232.

A light weight can is the last to leave the turret pocket 223 and is not ejected from the turret until the pocket has passed the inner end of the guide rail 234. It is then placed upon an under weight discharge chain 235 and is held in position on the chain between the guide rail 234 and a guide rail 236 also mounted upon the table 25 and extending parallel with the other guide rails. Both the conveyor chains 233, 235 at the machine end of the apparatus pass over and are carried by suitable sprockets 237 which may be properly mounted for operation within the discharge table 25.

Can ejecting devices are carried by the turret 224, one of these devices being associated with each of the turret pockets 223. The can ejecting device for each pocket includes an ejector finger mounted to move within the pocket at the proper time and to engage behind and eject a can. Each ejector finger may be mounted upon a vertical shaft 241 (Fig. 1) which is carried in the turret. The upper end of each shaft carries a lever 242 which in turn carries a cam roller 243. It is the engagement of a cam roller 243 at the proper position that effects movement of the lever 242 and oscillation of the shaft 241 to eject the can.

A movable cam unit 245 is provided for engaging a lever roller 243 at the first or normal position under normal weight can conditions. A second movable cam unit 246 is provided for engaging the roller at the second or over weight discharge position. Each cam unit has two positions, one a non-actuating position where the cam element is held above the path of travel of the roller 243 and the other an actuating position where it is in the path of travel of the roller.

The cam 245 is connected by a connecting link 247 with the control unit 174 and in a similar manner the cam 246 is connected to the detector unit by a connecting link 248. The cam 245 remains in lowered position as long as a trip rod 173 of the detector control unit is in its central position but when either of the other positions of the trip rod obtain, the cam 245 is lifted out of actuating position. Inasmuch as most of the cans passing through the machine are normal the cam 245 engages and actuates most of the ejector units of the various turret pockets 223.

The cam 246 is also normally in lowered or actuating position and this position obtains if the can associated with the trip rod 173 is either normal or over weight. Where such a can is over weight and where the cam 245 has been rendered inoperative the roller 243 associated with the pocket which contains the over weight can is first engaged by the cam 246 and its can is ejected onto the over weight chain 233.

In the event that the can is under weight and the associated trip rod 173 is in lowered position both of the cams 245 and 246 are moved out of actuating position and a roller 243 passing these cams is not actuated but the can associated with the pocket moves on past both of the chains 228 and 233. A fixed cam 249 is mounted above the turret 224 and a side of this cam engages the end of the conveyor 235.

Every cam roller 243 is thus engaged but the associated turret pocket is already empty if normal or over weight cans formerly occupied the pocket. An under weight can will be in the pocket at such a time and the ejecting device therefore discharges such a can onto the under weight chain 235. The full details of this operation are further explained in the Smith patent above mentioned and it is believed that further description is unnecessary for the present purposes.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can weighing machine, the combination of an endless conveyor arranged to follow a straight path and an arcuate path, scale units carried by said conveyor and adapted to receive and weigh cans, a said unit including a pivotally supported balance beam and a composite sliding weight unit which is carried on said beam, said unit comprising a main slidable weight member and an auxiliary increment weight member movable thereon, means for holding said scale units against weighing movement except during a plurality of weighing actions while a said scale unit is being carried along a straight path of said conveyor, means controllable at will for selectively shifting said main sliding weight member and said auxiliary weight member as a unit on said balance beam, and said auxiliary weight member alone relative to said beam, between said weighing actions, a detector member for a said scale unit and adapted to be actuated while carried along the said conveyor's arcuate path, means disposed in the path of and actuated by the balance beam of said scale unit positioned by its can during said weighing operations for setting an element of said detector member in accordance with the can weight, discharge mechanism for removing a weighed can from its scale unit, and means controlled by said detector member for selectively segregating the weighed cans by weight.

2. In a can weighing machine, the combination of an endless conveyor, scale units carried by said conveyor and adapted to receive and weigh cans, a said unit including a pivotally supported balance beam and a composite weight unit carried on said beam, said unit comprising a main weight member movable on said beam and an auxiliary weight member movable on said main weight member, means for holding said scale units against weighing movement except during light and heavy weight weighing action, means controllable at will for selectively shifting said main weight member and said auxiliary weight member as a unit on said balance beam, and said auxiliary weight member alone relative to said balance beam, to provide for different settings for the light and the heavy weighing actions, a detector member for a said scale unit and adapted to be actuated to register a light weight or a heavy weight for the can being weighed, and means controlled by said detector member when it registers a light weight or a heavy weight can for discharging the weighed cans according to their weight as light or heavy.

3. In a can weighing machine, the combination of an endless conveyor, scale units carried by said conveyor and adapted to receive and weigh cans to determine light weight, normal weight and heavy weight, a said unit including a pivotally supported balance beam and a composite weight unit carried on said beam, said unit comprising a main weight member and an auxiliary increment weight member movable thereon, means for holding said scale units against weighing movement except during light and heavy weight weighing actions, means controllable at will for selectively shifting said main weight member and said auxiliary weight member as a unit on said balance beam, and said auxiliary weight member alone relative to said balance beam, to provide for different settings for the light and the heavy weighing actions and to increase the normal weight range which is in between the other weights, a detector member for a said scale unit and adapted to be actuated when either a light weight or a heavy weight can is being weighed but which is not actuated by a normal weight can, and means controlled by said detector member for selectively discharging the weighed cans as a light weight, a normal weight or a heavy weight can.

4. In a can weighing machine, the combination of a scale unit for receiving and weighing cans, said scale unit comprising a balance beam pivotally mounted intermediate its ends and a sliding weight carried on said beam, an auxiliary weight selectively movably and fixedly mounted on said sliding weight, means for automatically subjecting said scale unit independently to light and heavy weighing actions to determine if a can within said scale unit is lighter or heavier than the desired weights in order to classify all cans as normal when they weigh in between such weights, means for selectively moving said sliding weight relative to and in one direction on its balance beam and said auxiliary weight on and relative to said sliding weight to provide for the desired light or heavy weight values and to obtain a light weighing action, and means for thereafter shifting said weight in the opposite direction on its balance beam to alter the normal weight range and to obtain a heavy weighing action.

5. In a can weighing machine, the combination of a scale unit for receiving and weighing cans, said scale unit comprising a balance beam pivotally mounted intermediate its ends and a composite sliding weight carried on said beam, means for subjecting said scale unit independently to light and heavy weighing actions to determine if a can within said scale unit is lighter or heavier than the desired weights in order to classify all cans as normal when they weigh in between such light and heavy values, means for setting and locking a part of said composite weight on its balance beam to provide for either the desired light or heavy weight value, said subjecting means including mechanism for successively shifting an unlocked increment of said composite weight upon and relative to the locked part thereof and in opposite directions relative to the pivotal mounting of said balance beam, whereby to alter the other of said weight values between said weighing actions.

6. In a can weighing machine, the combination of an endless conveyor, scale units carried by said conveyor and adapted to receive and weigh cans, each of said units including a pivotally supported balance beam and a composite sliding weight unit carried thereby, said unit comprising a main weight member shiftable on said beam and an auxiliary weight member movable relative to said main weight member and also adapted to be rigidly secured thereto, means cooperating with and operable through the movement of said conveyor for selectively shifting said weight members relative to the beam, means for holding said scale units against weighing movement in either direction except during a light weighing action and a heavy weighing action, and means for initially setting said weight members for said shifting movement so that the said main and auxiliary weight members may move as a unit on the beam or that the auxiliary weight member may be shifted alone on the main weight member while the latter is clamped against movement relative to the beam.

7. In a can weighing machine, the combination of an endless conveyor, scale units carried by said conveyor and adapted to receive and weigh cans, each of said units including a pivotally supported balance beam and a composite sliding weight unit carried thereby, said unit comprising a main weight shiftable on said beam and an auxiliary weight movable relative to said main weight and also adapted to be rigidly secured thereto, means for initially setting said weights for said shifting movement so that the main and auxiliary weights may move as a unit on the beam or that the auxiliary weight may be shifted alone on the main weight while the latter is clamped against movement relative to the beam, and means cooperating with and operable through the movement of said conveyor for selectively shifting said weights relative to the beam by engagement with said auxiliary weight.

WALTER E. ROONEY.